Feb. 14, 1967  E. E. BALDWIN  3,303,951
BOAT TRAILER HITCH
Filed Jan. 22, 1965  4 Sheets-Sheet 1
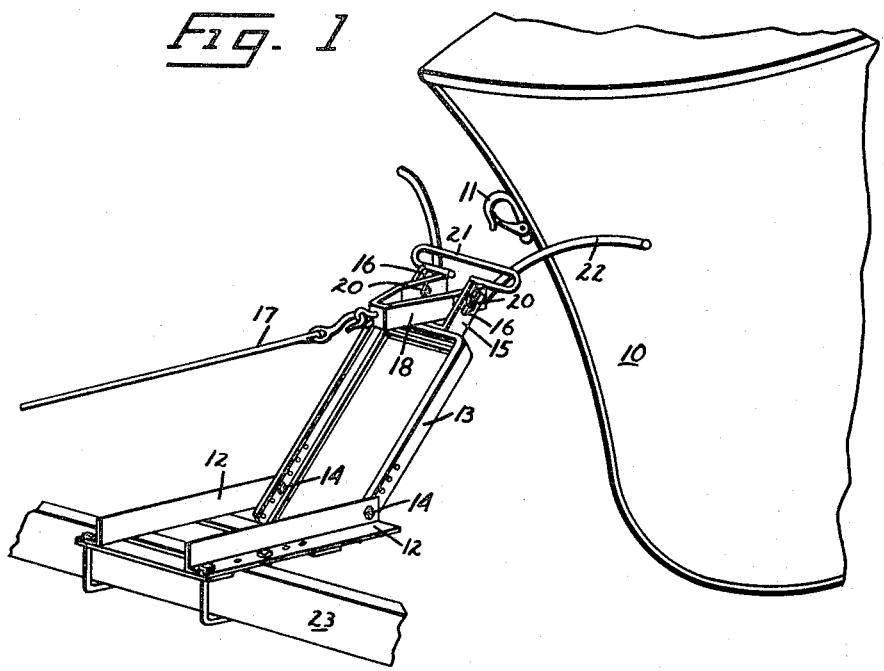
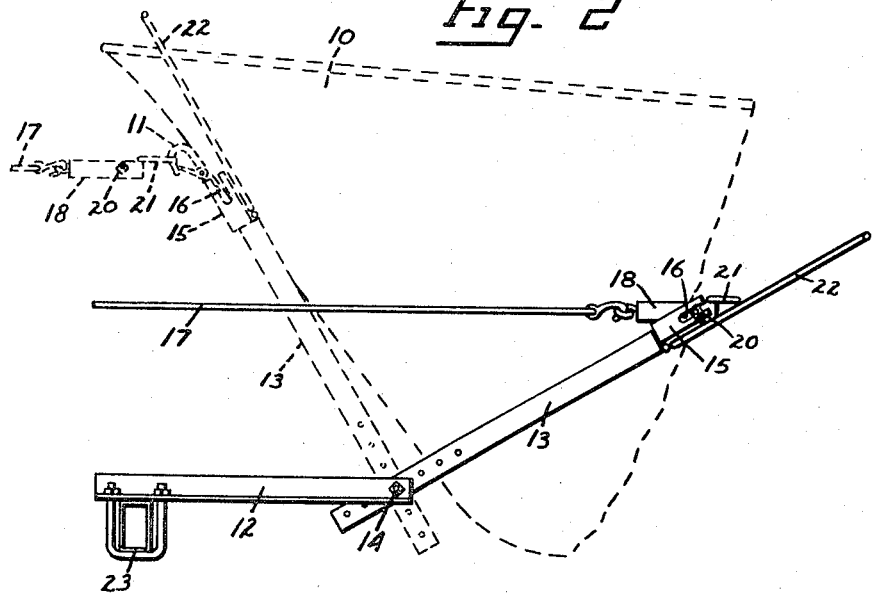
INVENTOR.
ERNEST E. BALDWIN
BY Wells & St. John
ATTYS.

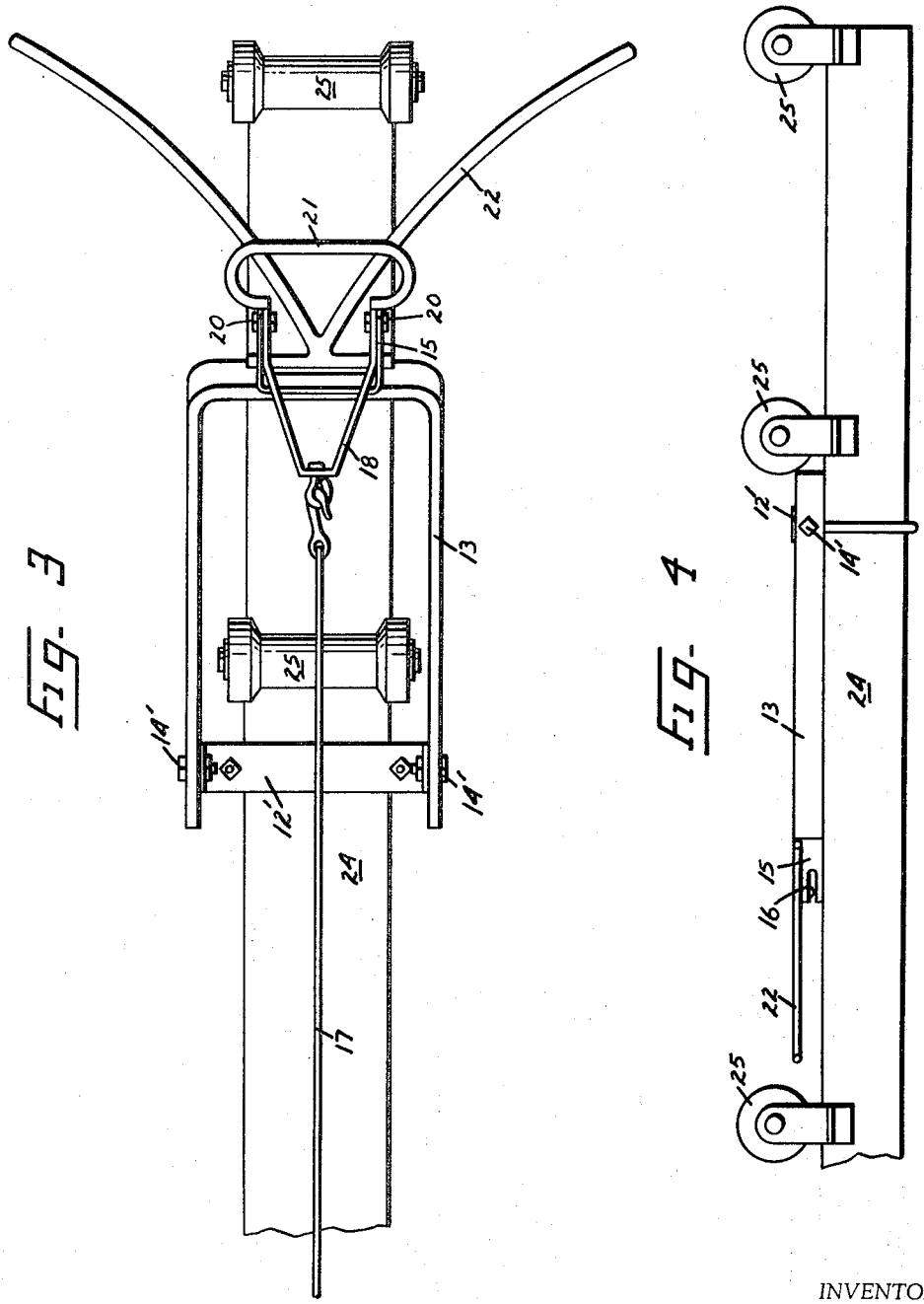

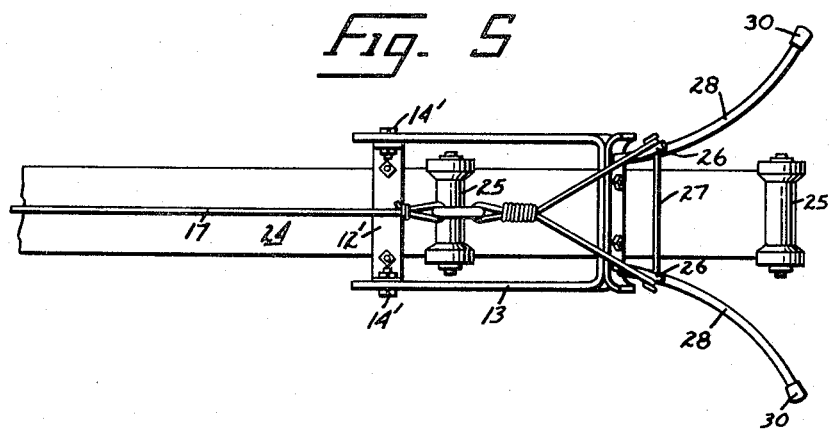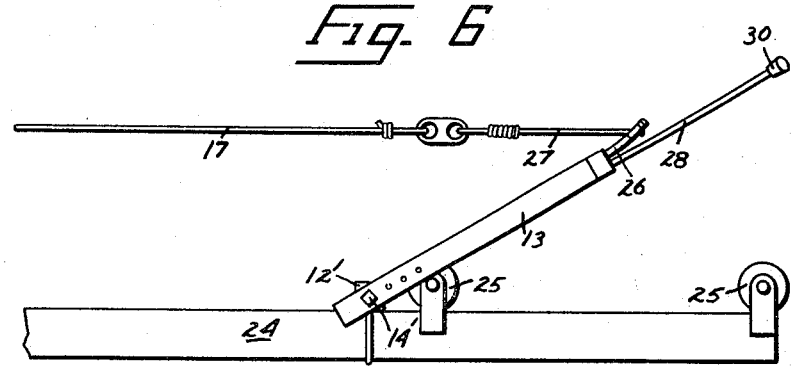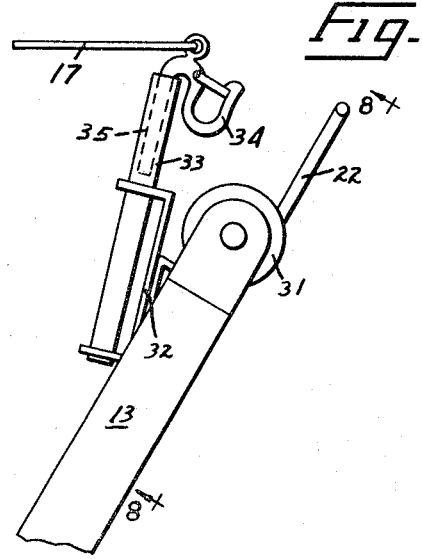

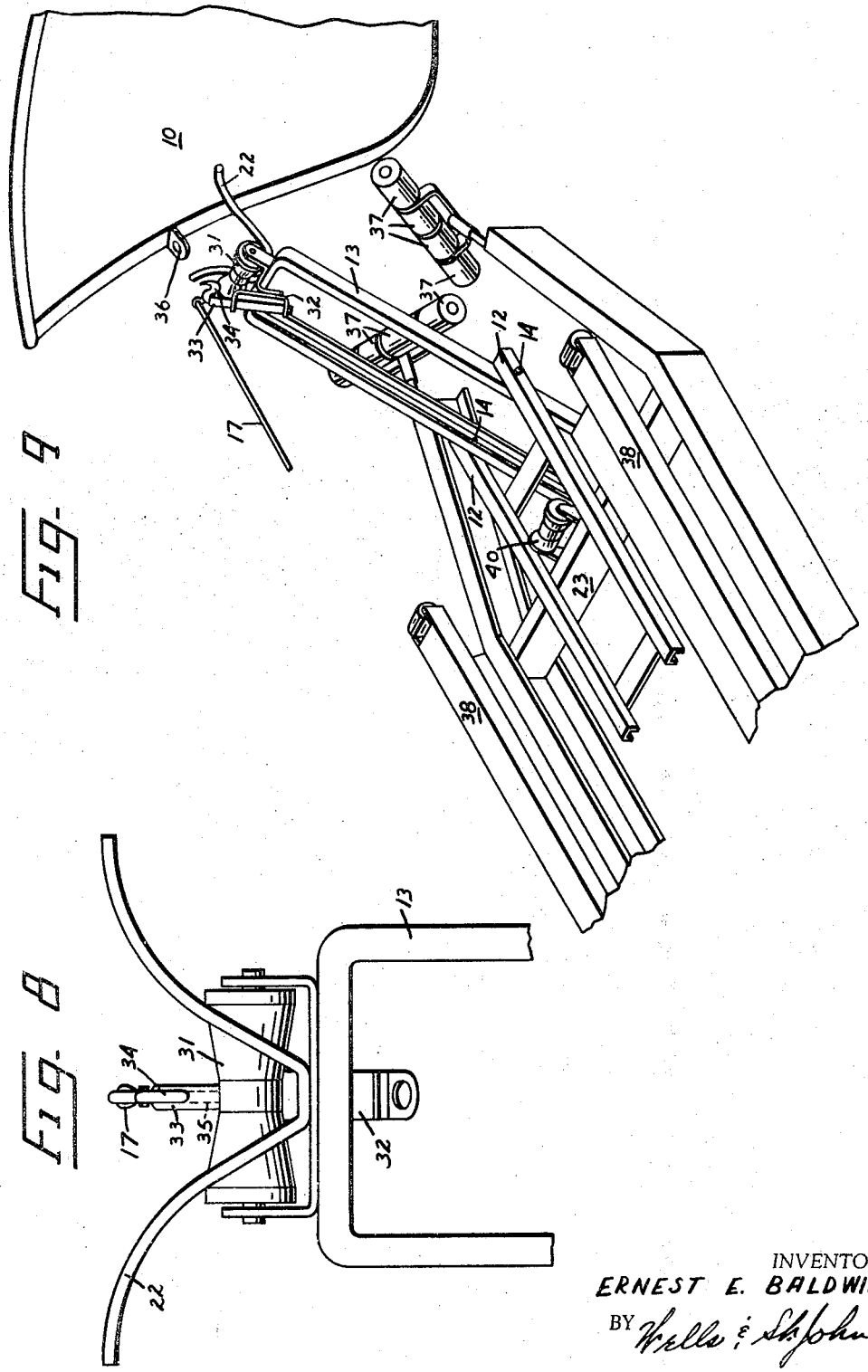

United States Patent Office 3,303,951
Patented Feb. 14, 1967

3,303,951
BOAT TRAILER HITCH
Ernest E. Baldwin, N. 1303 Monroe St.,
Spokane, Wash. 99201
Filed Jan. 22, 1965, Ser. No. 427,358
6 Claims. (Cl. 214—517)

This invention relates to a boat trailer hitch for automatically connecting to the prow of an oncoming boat the rear end of a tow line leading to a winch at the front tongue of a trailer on which the boat is to be loaded.

The boating public widely uses trailers of various designs and sizes to transport, launch, and retrieve pleasure and fishing boats. The trailers utilize many different types of boat supporting elements to cradle the boat hull and to facilitate loading and unloading of the boat relative to the trailer. These trailers normally use a tow line that is connected to the prow of the boat and which leads forwardly to a winch mounted on the tongue of the trailer. The winch and towline control longitudinal movement of the boat relative to the trailer. The boat supporting elements of most trailers are self-centering to some extend and once the tow line has been attached to the prow of a boat and the boat brought into engagement with the transom rollers at the rear of the trailer, the boat can be pulled forward by the tow line into proper position on the trailer without further manipulation of the boat. The most difficult problem in loading a boat from water onto a trailer is the attachment of the boat to the rear end of the tow line, particularly when no one is available to assist the operator of the boat. The present device provides a mechanical arrangement whereby the operator of the boat, by merely powering the boat toward the rear of the trailer, can automatically cause the prow of the boat to be engaged by the rear of the tow line.

It is a first object of this invention to provide a simple mechanical attachment for a boat trailer to automatically connect the rear end of a tow line to the prow of an oncoming boat.

It is another object of this invention to provide such a device with automatic guidance means on it to assist the boat operator in centering the boat relative to the trailer and rope attaching mechanism.

Another object of this invention is to provide such a device which will not in any manner interfere with the normal operation of the boat trailer after attachment of the line to the boat.

These and further objects will be evident from the following disclosure, taken together with the accompanying drawings, the various figures of the drawings illustrating slightly modified versions of the basic invention. It is to be understood that the embodiments of the invention illustrated in the drawings are not intended to restrict or limit the scope of the invention as it is defined in the claims that follow the detailed specification.

In the drawings:

FIGURE 1 is a fragmentary perspective view of the present apparatus showing it in relation to an oncoming boat, portions of the trailer and boat being broken away;

FIGURE 2 is a fragmentary side elevational view of the apparatus seen in FIGURE 1, portions of the trailer being broken away and an alternate position of the apparatus and prow of a boat being illustrated in dashed lines;

FIGURE 3 is an enlarged top view of the apparatus shown in FIGURE 2 adapted for attachment to a trailer having a longitudinal rear tongue;

FIGURE 4 is a reduced fragmentary side elevation view of the apparatus shown in FIGURE 3, the device being illustrated in its position adjacent to the trailer frame after a boat has been loaded onto the trailer;

FIGURE 5 is a top view similar to FIGURE 3, but illustrating a modified form of the invention;

FIGURE 6 is a side view of the apparatus shown in FIGURE 5;

FIGURE 7 is a side view of the tow line attaching means in a third form of the invention;

FIGURE 8 is a bottom view of the apparatus shown in FIGURE 7 as viewed along line 8—8; and FIGURE 9 is a view similar to FIGURE 1, but illustrating the embodiment of the invention shown in FIGURES 7 and 8.

Referring now to the drawings, the first form of this invention is shown in FIGURES 1 through 4. FIGURES 1 and 2 illustrate this first form of the invention as applied to a trailer having a transverse frame member. FIGURES 3 and 4 illustrate the same form of the invention as mounted on a trailer having a longitudinal rear tongue or keel support. In both cases, the tow line attaching arrangement is identical and the same reference numerals will be used to designate identical portions of the apparatus.

As seen in FIGURE 1, the apparatus is designed to attach the rear end of a tow line 17 to the prow of an oncoming boat 10 which is to be loaded onto a trailer having a transverse rear frame member 23. In such a case, there will be the usual transom rollers located rearwardly of the frame member 23, but these have not been illustrated in FIGURES 1 and 2 in order to simplify the presentation of the instant device.

The prow of boat 10 is provided with a hook 11 of the type having a rigid U-shaped member directed downwardly and secured in a fixed position to the front end of boat 10. Hook 11 is selectively closed by a resilient or spring biased closure member extending along its downwardly open lower section. The present invention provides an apparatus for automatically engaging hook 11 by the rear end of a tow line 17. The tow line 17 leads forwardly to a winch (not shown) on the front tongue of the boat trailer.

The apparatus includes a U-shaped supporting member 13 that is pivotally mounted on the framework of the trailer by means of a supporting bracket 12. The bracket 12 is secured rigidly to the trailer frame and therefore becomes a part of it. The member 13 is pivotally connected to the bracket 12 by adjustable bolts 14 to provide a frictional pivot for movement of the member 13 from a position extending rearwardly and upwardlp from its pivotal connection at 14 (FIGURE 2) to a second position folded forwardly adjacent to the frame of the trailer (FIGURE 4). The member 13 is formed in an open U-shaped configuration so as to enable it to straddle any central keel rollers mounted on the trailer. The open configuration of member 13 enables it to fold below such rollers and not obstruct normal operation of the trailer supporting elements. The member 13 is provided with a series of apertures through which are selectively located the pivoting bolts 14 so that the operative length of the member 13 can be selected to match the location of the hook 11 on a particular boat 10.

At the outer end of the member 13 is a fixed bracket 15 comprised of two outstanding ears formed on a bent U-shaped piece of metal. The outer ends of the bracket 15 are formed with open longitudinal slots 16. The slots 16 releasably hold bolts 20 that protrude from a U-shaped end support 18 attached to the rear end of the tow line 17. The end support 18 is provided with a rear transverse rod 21 extending across the width of the support 18 and adapted to be received within the hook 11. The slots 16 slidably receive the bolts 20, which can permit the support 18 to be pulled from the connection with bracket 15 after the member 13 has been pivoted forwardly beyond a position perpendicular to the frame of the boat trailer.

Protruding beyond the outer end of the supporting member 13 is a guide member 22 formed in this particular instance as a bent rod diverging outwardly as a longitudinal extension of the supporting member 13.

The identical apparatus is illustrated in FIGURES 3 and 4 as mounted on a trailer having a longitudinal tongue or keel support member 24 on which is secured a fixed bracket 12'. In this instance the supporting member 13 is shown pivoted by bolts 14'. The longitudinal tongue 24 is provided with a series of keel rollers 25 in the conventional fashion and it can be seen that the open configuration of member 13 does not interfere with the normal use of the rollers 25.

In the first embodiment of the invention shown generally in FIGURES 1 through 4, the transverse rod 21 at the end of tow line 17 can be automatically engaged within the hook 11 on boat 10. Prior to receiving the boat, the member 13 is manually positioned as shown in full lines in FIGURES 1 through 3. In this position, it extends upwardly and rearwardly relative to the trailer frame and relative to its pivotal connection 14 or 14'. The tow line 17 would be drawn forwardly by the winch to a position substantially parallel to the trailer frame with little or no slack. The member 13 would therefore be supported in this desired angular relationship by the tow line 17 and by the frictional resistance of bolts 14.

As the boat 10 approaches the rear of the trailer, it will be guided by the operator of the boat to a position wherein the prow of boat 10 engages the area between the diverging arms of the guide member 22. The guide member 22 will automatically center the forward end of the boat, which will then come into contact with the transverse rod 21. Additional forward movement of the boat relative to the trailer will cause the member 13 to pivot in a counterclockwise direction as shown in FIGURE 2. The location of the rod 21 relative to the pivotal bolts 14 or 14' is such that the rod 21 will fit within the hook 11 prior to the member 13 having attained a position perpendicular to the trailer frame. Preferably, the engagement of the rod 21 by hook 11 should be immediately prior to the attainment of a perpendicular position by member 13.

After the hook 11 has received the rod 21, the rod 21 cannot become disengaged. The operator of the boat can then leave the boat and can operate the winch to draw the tow line 17 forwardly relative to the trailer. This motion, as shown in FIGURE 2, will automatically draw the boat over the trailer in the normal fashion, lifting it to the supporting rollers or other devices on the trailer. The prow of the boat will continue to push the member 13 and the support 18 will automatically become disengaged from the slots 16 on bracket 15 so that the tow line 17 is free. The member 13 will be pushed by the boat to a forward position (FIGURE 4) below the supporting keel rollers 25 and will not obstruct normal operation of the trailer. After the boat has been unloaded, the member 13 and support 18 must be manually reset in the positions shown in FIGURES 1 through 3 for reception of the boat once again.

In FIGURES 5 and 6, a slightly modified form of the original version is shown. Again, the same numerals are used to show the elements previously described. The only modification is that a loop 27 formed at the end of the tow line 17 is directly engaged by the previously described hook 11 on a boat 10. The loop 27 is supported at the outer end of the member 13 by upstanding brackets 26 that are transversely separated from one another and adapted to stretch the rear end of loop 27 in a transverse position for reception within the hook 11. In this instance, the guide member is shown as individual rods 28 diverging outwardly from the outer end of the member 13 and provided with protective rubber tips 30 for safe engagement of the boat surfaces.

The operation of this device is precisely that previously described, the transverse end of the loop 27 being engaged within the hook 11 and being selectively freed from the brackets 26 after the member 13 has passed its position perpendicular to the trailer frame. The outer ends of the brackets 26 are clear so as to permit passage of the loop 27 when tension is applied to the tow line 17.

The third form of the invention is shown in FIGURES 7 through 9. Again, it utilizes substantially the same supporting apparatus which is identified by numbers identical to those previously described. At the outer end of the member 13 in this instance is provided a protective transverse roller 31 for engagement with the prow of the boat 10. In this case, the releasable hook is on the end of the tow line 17 rather than on the boat 10. The boat 10 is provided with a horizontal eye 36 fixed to the prow of the boat 10 and engageable by a releasable hook 34 at the rear end of tow line 17. The hook 34 has a downwardly extending base 35 received within a flexible tubular member 33 fixed to a bracket 32 at the outer end of the member 13. The support 33 can be a length of rubber or plastic tubing or other suitable flexible material that will frictionally hold the base 35 of hook 34 and permit disengagement of the hook 34 due to tension on the tow line 17. Again a guide member 22 is provided as previously described to assist in centering the prow of the boat 10 relative to the trailer.

The arrangement shown in FIGURE 9 illustrates this apparatus mounted on a trailer having a transverse rear member 23 and also illustrates additional side bunks 38 on the trailer as well as rear transom rollers 37 and keel rollers 40. As noted above, the open configuration of member 13 allows it to pivot freely over the keel rollers 40 without interfering with the normal operation of the rollers 40 in supporting the bottom ridge of the boat 10. The transom rollers 37 shown in FIGURE 9 are illustrated by way of example only, and it is to be understood that such members as are normally provided on a trailer will provide the necessary lift and centering for the boat over the trailer. The only purpose of the present device is to automatically connect the end of the tow line 17 to the prow of the boat 10.

The operation of the embodiment of the device shown in FIGURES 7 through 9 is believed to be evident. Again, the boat is driven against the roller 31 to pivot the member 13 in a forward direction until the hook 34 is brought into engagement with the eye 36. At that time, the operator of the boat can safely leave it and operate the winch to draw the tow line 17 forwardly and locate the boat 10 on the trailer in the usual manner. After the supporting member 13 has reached a substantially vertical position, the hook 34 will slidably free itself from the flexible support member 33 and the member 13 will fold beneath the keel rollers 40 to a position similar to that illustrated in FIGURE 4.

The several modified versions of this device illustrated in the drawings are not intended to limit my invention, which is basically concerned with the use of a movable support element for the end of a tow line that is releasably carried by it and the proper guidance members on the support for assisting the operator of a boat in reaching the necessary position for engagement of the boat by the tow line automatically due to movement of the boat alone. By this structure, one man can readily load a boat onto a trailer, an operation commonly calling for outside assistance.

Having thus described my invention, I claim:

1. A boat trailer hitch for attaching to the prow of a boat the rear end of a tow line leading to a forward winch on the trailer, comprising:
   a trailer frame;
   a rigid member pivotally connected to the frame about a transverse axis adjacent the rear end thereof, said member being pivotable from a first position wherein it extends upwardly and rearwardly from its frame connection to a second position folded forwardly within said frame;

releasable means on the outer end of said member for holding the rear end of the tow line;

rearwardly diverging guide means mounted on said member to center a boat in contact therewith;

and complementary securing means provided at the rear end of the tow line and on the prow of the boat, said securing means being operative to automatically attach the rear end of the tow line to the prow of the boat following centering of a boat prow between said guide means and continued forward motion of the boat prow relative to the trailer frame, causing pivotal motion of said rigid member between its first position and a position perpendicular to said frame.

2. A hitch as defined in claim 1 wherein said releasable means comprises:

a pair of upstanding brackets fixed to the outer end of said member and protruding outwardly therefrom to support between them a loop formed at the rear end of the tow line.

3. In combination with a boat having a hook at its prow formed with a downwardly open rigid member fixed to the boat and an upwardly pivotable closure spanning the hook opening, a boat trailer hitch for attaching the rear end of a tow line on a trailer to said hook comprising:

a rigid supporting member adapted to be pivotally mounted on a boat trailer frame for movement relative thereto about a transverse pivotal axis between a first position extending rearwardly and upwardly from its pivotal connections to the trailer frame and a second position folded forwardly within said frame;

releasable means on the outer end of said member for holding the rear end of a tow line leading forwardly to a winch on the trailer frame;

rearwardly diverging guide means mounted on said member to center a boat in contact therewith;

and enclosed securing means provided at the rear end of the tow line, said securing means being automatically engageable within the hook at the boat prow following centering of the boat prow between said guide means and continued forward motion of the boat prow relative to the trailer frame, causing pivotal motion of said rigid member between its first position and a position perpendicular to said frame.

4. The apparatus as defined in claim 3 wherein the location of the rear end of the tow line relative to the pivotal connection of the supporting member on the frame is such that the rear end of the tow line will be received within said hook prior to the member having achieved a perpendicular position relative to the trailer frame;

said releasable means being adapted to free the rear end of said tow line from engagement with said member after said member achieves a vertical position relative to the trailer frame.

5. In combination with a boat having a hook at its prow formed with a downwardly open rigid member fixed to the boat and an upwardly pivotable closure spanning the hook opening, a boat trailer hitch for attaching the rear end of a tow line on a trailer to said hook comprising:

a rigid supporting member adapted to be pivotally mounted on a boat trailer frame for movement relative thereto about a transverse pivotal axis between a first position extending rearwardly and upwardly from its pivotal connection to the trailer frame and a second position folded forwardly within said frame;

a pair of upstanding brackets formed at the outer end of said member as a longitudinal extension thereof to support between them a loop at the rear end of a tow line leading forwardly to a winch on the trailer frame, the location of the loop on said member being such as to engage said hook responsive to forward pivotal motion of the rear end of said member due to contact with the prow of the boat and prior to the attainment of a perpendicular position of said member relative to the trailer frame.

6. In combination with a boat having a hook at its prow formed with a downwardly open rigid member fixed to the boat and an upwardly pivotable closure spanning the hook opening, a boat trailer hitch for attaching the rear end of a tow line on a trailer to said hook comprising:

a rigid supporting member adapted to be pivotally mounted on a boat trailer frame for movement relative thereto about a transverse pivotal axis between a first position extending rearwardly and upwardly from its pivotal connection to the trailer frame and a second position folded forwardly within said frame;

a pair of upstanding brackets formed at the outer end of said member as a longitudinal extension thereof to support between them a loop at the rear end of a tow line leading forwardly to a winch on the trailer frame, the location of the loop on said member being such as to engage said hook responsive to forward pivotal motion of the rear end of said member due to contact with the prow of the boat and prior to the attainment of a perpendicular position of said member relative to the trailer frame;

and a pair of outwardly diverging rod guides fixed to and extending from said member at the outer end thereof.

References Cited by the Examiner

UNITED STATES PATENTS

| | | | |
|---|---|---|---|
| 2,799,408 | 7/1957 | Overton | 214—84 |
| 3,009,589 | 11/1961 | Martz | 214—84 |

GERALD M. FORLENZA, *Primary Examiner.*

ALBERT J. MAKAY, *Examiner.*